United States Patent
Brady et al.

(10) Patent No.: US 10,066,471 B2
(45) Date of Patent: Sep. 4, 2018

(54) METHOD FOR ENHANCING HYDROCARBON RECOVERY FROM TIGHT FORMATIONS

(71) Applicants: SANDIA CORPORATION, Albuquerque, NM (US); Patrick V. Brady, Albuquerque, NM (US); Charles R. Bryan, Albuquerque, NM (US)

(72) Inventors: Patrick V. Brady, Sandia Park, NM (US); Charles R. Bryan, Albuquerque, NM (US); Helmuth J. Heneman, Thompson, TN (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 14/976,102

(22) PCT Filed: Dec. 23, 2014

(86) PCT No.: PCT/US2014/072209
§ 371 (c)(1),
(2) Date: Dec. 21, 2015

(87) PCT Pub. No.: WO2016/105395
PCT Pub. Date: Jun. 30, 2016

(65) Prior Publication Data
US 2017/0356281 A1  Dec. 14, 2017

(51) Int. Cl.
*E21B 43/26* (2006.01)
*E21B 43/16* (2006.01)
*E21B 41/00* (2006.01)
*E21B 49/08* (2006.01)
*C09K 8/58* (2006.01)

(52) U.S. Cl.
CPC ............... *E21B 43/26* (2013.01); *C09K 8/58* (2013.01); *E21B 41/0092* (2013.01); *E21B 43/16* (2013.01); *E21B 49/08* (2013.01)

(58) Field of Classification Search
CPC ...... E21B 43/15; E21B 43/25; E21B 41/0092; E21B 43/16; E21B 49/08; C09K 8/58
See application file for complete search history.

(56) References Cited

U.S. PATENT DOCUMENTS 8,812,271 B1    8/2014  Brady et al.
9,518,449 B1 *  12/2016 Brady ................. E21B 41/0092
(Continued)

*Primary Examiner* — Yong-Suk Ro
(74) *Attorney, Agent, or Firm* — Daniel J. Jenkins

(57) ABSTRACT

A method of increasing recovery of liquid hydrocarbons from subsurface reservoirs, and particularly from those located in tight formations, is disclosed. One aspect includes calculating the in situ fractured formation wettability from real-time measurement of flowback volume and composition. Another aspect includes determining the composition of the fracturing fluid, the overflush or both, that will achieve higher liquid hydrocarbon recovery by increasing the water wettability of rock surfaces within the reservoir. Monitoring of rock-surface wettability through flowback volume and composition profiles allows the above mentioned injectates to be adjusted in the field to achieve maximal recovery. Other methods, apparatuses, and systems are disclosed.

38 Claims, 7 Drawing Sheets

(56) References Cited

U.S. PATENT DOCUMENTS

| | | | |
|---|---|---|---|
| 2009/0308609 A1* | 12/2009 | Curole | E21B 43/20 166/275 |
| 2012/0138316 A1* | 6/2012 | Matzakos | C09K 8/592 166/400 |
| 2012/0227975 A1* | 9/2012 | Ayirala | E21B 43/20 166/344 |
| 2014/0311750 A1 | 10/2014 | Heneman et al. | |

* cited by examiner a. Before treatment.  b. After treatment.

METHOD FOR ENHANCING HYDROCARBON RECOVERY FROM TIGHT FORMATIONS

STATEMENT OF GOVERNMENT RIGHTS

This invention was developed under Contract DE-AC04-94AL85000 between Sandia Corporation and the U.S. Department of Energy. The U.S. Government has certain rights in this invention.

RELATED APPLICATION

This application claims priority to United States PCT Application No. PCT/US14/72209 filed on Dec. 23, 2014, and entitled "METHOD FOR ENHANCING HYDROCARBON RECOVERY FROM TIGHT FORMATIONS", the entirety of which is incorporated herein by reference.

BACKGROUND

A method of increasing recovery of liquid hydrocarbons from subsurface reservoirs, and particularly from those located in tight formations, is disclosed. One aspect includes calculating the in situ fractured formation wettability from real-time measurement of flowback volume and composition. Another aspect includes determining the composition of the fracturing fluid, the overflush or both, that will achieve higher liquid hydrocarbon recovery by increasing the water wettability of rock surfaces within the reservoir. Monitoring of rock-surface wettability through flowback volume and composition profiles allows the above mentioned injectates to be adjusted in the field to achieve maximal recovery. Other methods, apparatuses, and systems are disclosed.

Production of liquid hydrocarbons from reservoirs is controlled by natural forces, such as solution gas expansion and natural water drive, or by engineered forces during enhanced oil recovery (EOR), such as injection of steam, surfactants, solvents or $CO_2$, or the creation of differential water pressures such as in a waterflood operation. Steam injection decreases liquid hydrocarbon viscosity. Surfactant injection decreases liquid hydrocarbon-water interfacial tension. $CO_2$ injection simultaneously reduces liquid hydrocarbon-water interfacial tension and enhances formation pressure. Polymer injection is a physical EOR technique that improves waterflood sweep efficiency by blocking zones whereby water would otherwise bypass liquid hydrocarbons.

Primary liquid hydrocarbon recovery relies on natural forces; secondary and tertiary recovery rely on engineered forces. Traditionally, primary recovery is followed by secondary recovery (waterflooding), then tertiary recovery. The analysis described herein differs from the traditional approach to liquid hydrocarbon recovery because it develops an up-front understanding of the chemical forces that hold the liquid hydrocarbon in the particular reservoir to begin with, then uses that understanding to design an overall liquid hydrocarbon recovery strategy that maximizes recovery of liquid hydrocarbons.

SUMMARY

The techniques envisioned herein implement a novel chemical recovery method for separating liquid hydrocarbons from their source rock. Whereas traditional EOR techniques focus on improving physical movement of water, liquid hydrocarbon properties, or both, the techniques envisioned herein break the chemical bonds that hold liquid hydrocarbons to reservoir surfaces. By adding the important component of reservoir surface chemistry, the analysis and techniques described herein are intended to work independently, or in conjunction with most other EOR methods.

Embodiments of the invention relate generally to the recovery of liquid hydrocarbons from subterranean reservoirs in tight underground liquid hydrocarbon-bearing formations that are hydrofractured ("fractured"). Liquid hydrocarbon recovery from hydrofractured tight formations is typically less than 10% of the original liquid hydrocarbon in place. A fraction of the remaining liquid hydrocarbon is located in restricted spaces that natural and engineered fractures will never drain.

Experience from traditional reservoirs suggests that a substantial fraction of the liquid hydrocarbon remaining in tight formations after fracturing will be attached to mineral surfaces in, or in close proximity to macrofractures and microfractures (and/or pore spaces) from which the liquid hydrocarbon might be extracted if the mineral surfaces can be chemically altered to become more water wet (hydrophilic), or, equivalently, less oil wet.

The clays and carbonate minerals found in unstimulated sandstone and limestone reservoirs are present in tight formations as well. This means that chemical methods for increasing water wettability of unstimulated sandstone and limestone reservoirs in waterflooding (such as changing pH, hardness, and salinity) may be modified to increase the water wettability of tight formations. While tight formations cannot easily be waterflooded because of their low permeabilities, tight formations are exposed to large volumes of water in the slickwater fracturing, proppant placement, and overflush, stages of well development. The method described herein modifies the chemistry of the slickwater, or an overflush, or both, to make the tight formation more water wet.

Calculably altering the pH, salinity, and hardness of the fluids involved in each stage to increase water wettability in near-fracture areas, as described herein, will increase the amount of liquid hydrocarbon recovered. This is true for both vertical wells and horizontal wells, and for single well "huff and puff" injection of water for recovery of additional liquid hydrocarbon from a previously fractured well.

The method described herein also provides a real-time measure of recoverable liquid hydrocarbon from flowback volume and chemistry measurements by calculating a correlation between liquid hydrocarbon recovery and retained water chemistry. The ability to anticipate liquid hydrocarbon recovery allows rapid adjustment of injectate chemistry in the field to maximize recovery. The method also allows low value waters, such as saline produced waters, to be more widely used for fracturing, instead of high value fresh waters.

For the purpose of the description herein, the following definitions shall apply:

Tight Reservoir or Tight Formation—A relatively impermeable reservoir rock from which hydrocarbon production is difficult, and production is economically feasible only through inducing fractures.

Flow Back—Fluid flowing from a well following a treatment such as fracturing.

Overflush—The injection of a solution for introducing chemicals for enhancing reservoir water wettability into a fracture and retained water zone, either during gel removal or any time thereafter.

Huff and Puff—A cyclic process in which a well is injected with a recovery enhancement fluid and, after a soak period, the well is put back on production.

Retained Water—Fluid pumped into a well that not does not return because it remains in the formation.
Injectate—Fluid injected into a well.
Waterflooding—Injecting water into a well to displace residual oil from adjacent well(s).
Slickwater—Water combined with a friction-reducing chemical with or without proppants.
Fracturing Fluid—A fluid injected into a well as part of a stimulation operation to create fractures in the underground formation thereby increasing the productivity of the well.
Rock—An aggregate of minerals and/or non-crystalline solids, with or without organic matter, including but not limited to sandstones, shales and limestones.
Wettability—The preference of a solid surface for water or oil in a water-oil mixture. In a water wet system (e.g., "water wettability"), oil adhesion is minimal because of a relative absence of oil-solid electrostatic attraction and/or the presence of a very thick water surface layer between the two. Conversely, oil wetting occurs (e.g., "oil wettability") when electrostatic adhesion of oil for a solid surface is high and/or when the water layer separating the two is very thin.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
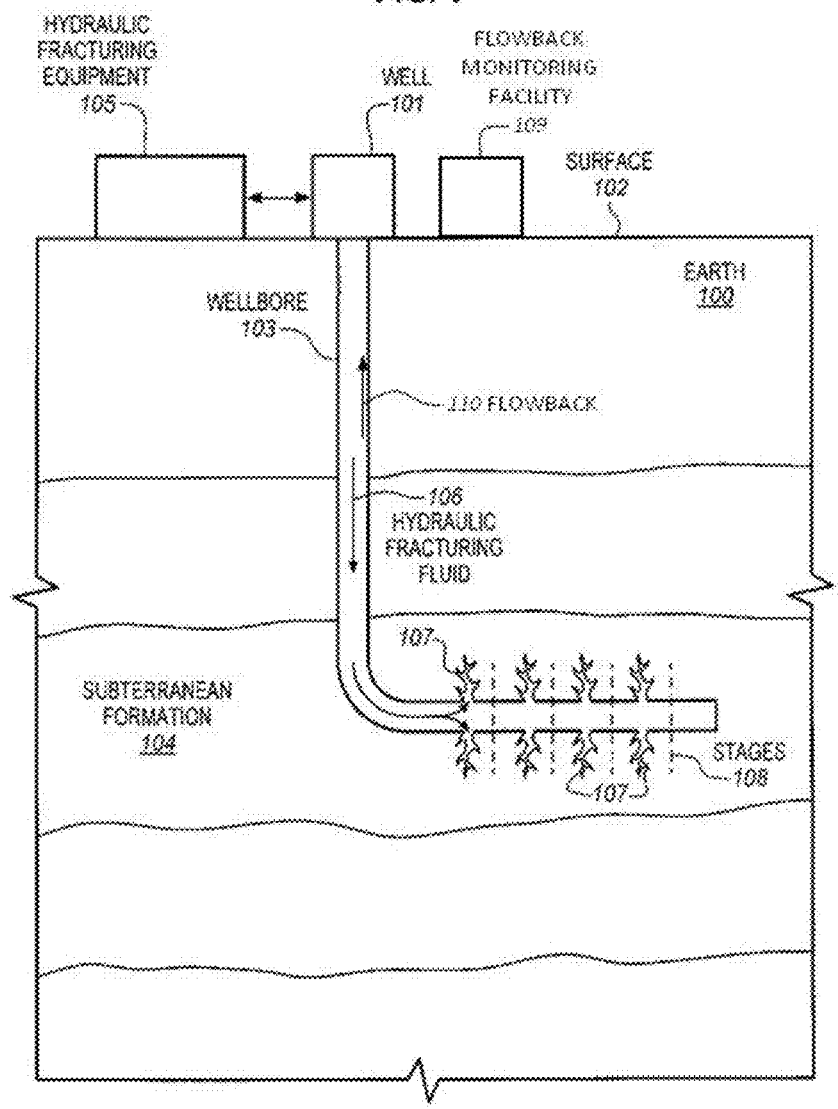
FIG. 1 is a schematic of a fracturing job in a horizontal borehole.

Disclosed herein are new and useful methods, apparatus, systems, and other features for increasing recovery of liquid hydrocarbons from subsurface reservoirs, and particularly from those located in tight formations. Referring to FIG. 1, four fracture stages in a horizontal well through a tight formation are shown. A well 101 has been drilled from the surface 102 of the earth 100, which includes a wellbore 103 that ultimately horizontally penetrates a liquid hydrocarbon-bearing formation 104. Hydraulic fracturing equipment 105 is used to produce and pump a hydraulic fracturing fluid 106 into several frac stages 107 and 108. The flowback 110 is then pumped back to a flowback monitoring unit 109.

Figure 2:
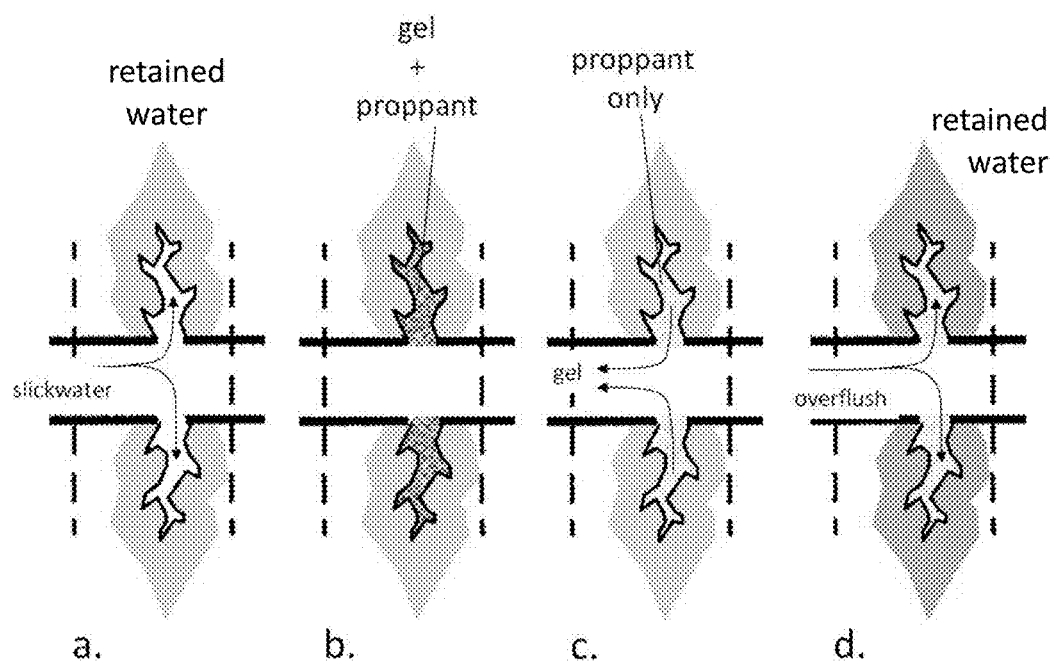
FIG. 2 shows the stages of a fracturing job in a single fracture.

FIG. 2 illustrates a typical sequence of hybrid fracturing: a.) slickwater fracturing and water being retained, followed by b.) emplacement of a proppant by a gel, followed by c.) breaking of the gel, and d.) optional overflush of the fracture surfaces with a designer injectate as described more fully herein. Often as much as 80% of the water injected in a fracturing job is not recovered back up the borehole and is referred to as retained water. Some of the retained water resides in the fracture network and a lesser amount imbibes into the rock matrix.

Figure 3:
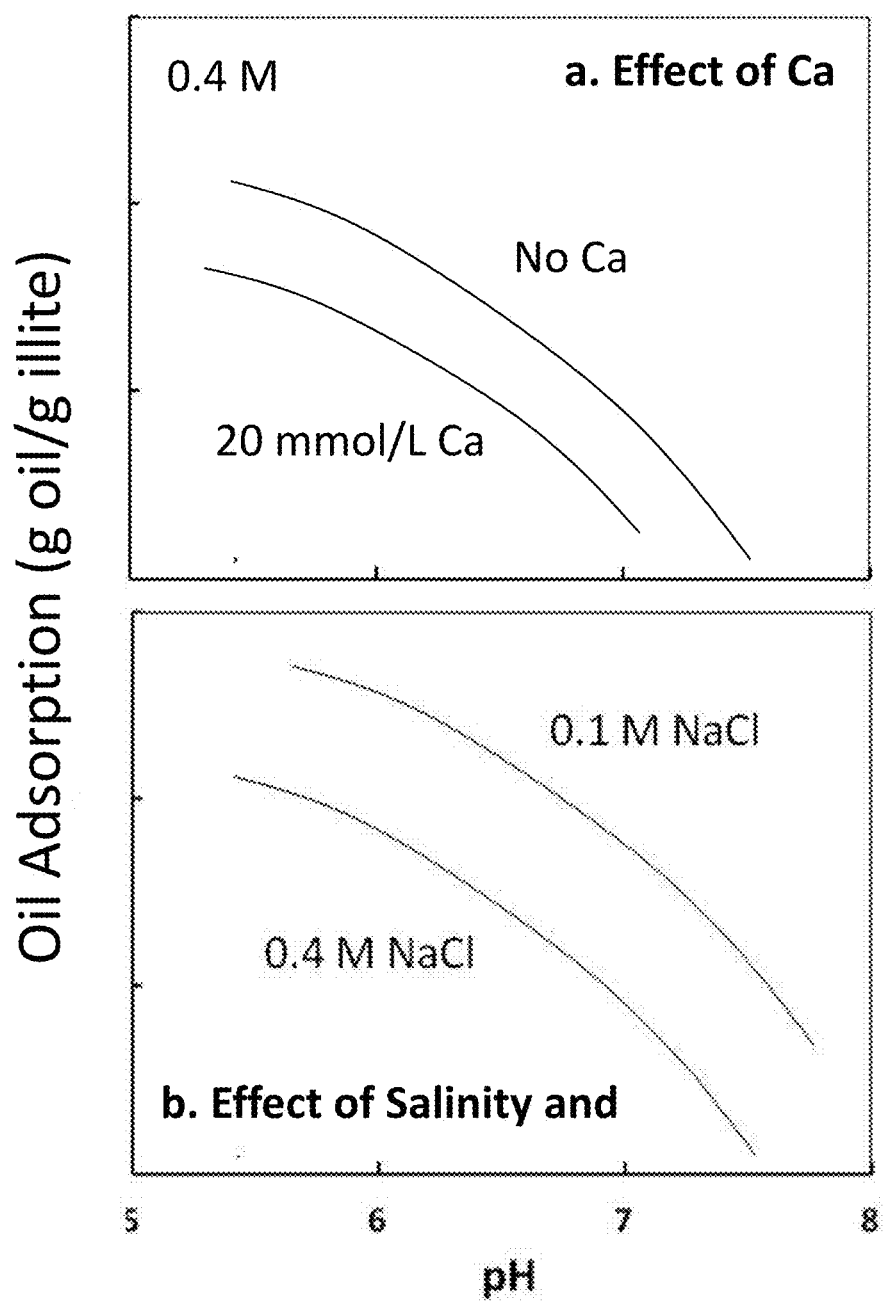
FIGS. 3a and 3b show measured liquid hydrocarbon adsorption to illite in a 0.01M NaCl solution.

FIG. 3 schematically illustrates laboratory confirmed trends of measured adsorption of a high base, low acid, liquid hydrocarbon onto illite clay as a function of pH. Illite, fluid, and oil were equilibrated in ~1:100:10 volumetric ratios, then the illite separated from the mixture by centrifugation and freezing. Oil sorbed to the illite was extracted with hexane and quantified with a spectrophotometer. FIG. 3a shows that added Ca decreases oil adsorption. FIGS. 3a and 3b show that increased pH decreases oil adsorption. FIG. 3b shows that increased salinity decreases oil adsorption to illite. For this case of high base, low acid oil sorption on illite, increased salinity decreases the number of oppositely charged oil and rock surface species to decrease oil sorption more than increased salinity favors oil adsorption by decreasing water layer thickness.

Figure 4:
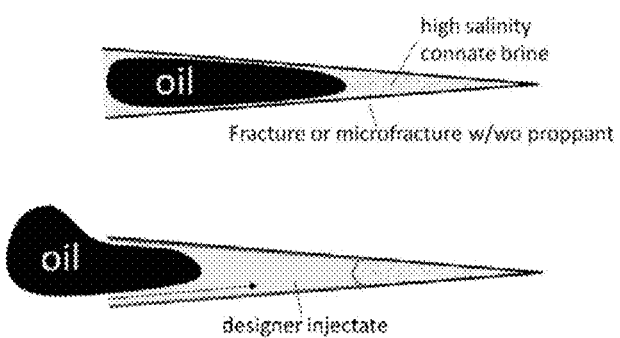
FIG. 4 is a schematic of liquid hydrocarbon mobilization through countercurrent imbibition by designer injectate.

FIG. 4 shows liquid hydrocarbon mobilization by countercurrent imbibition of liquid hydrocarbon out of a microfracture.

Figure 5:
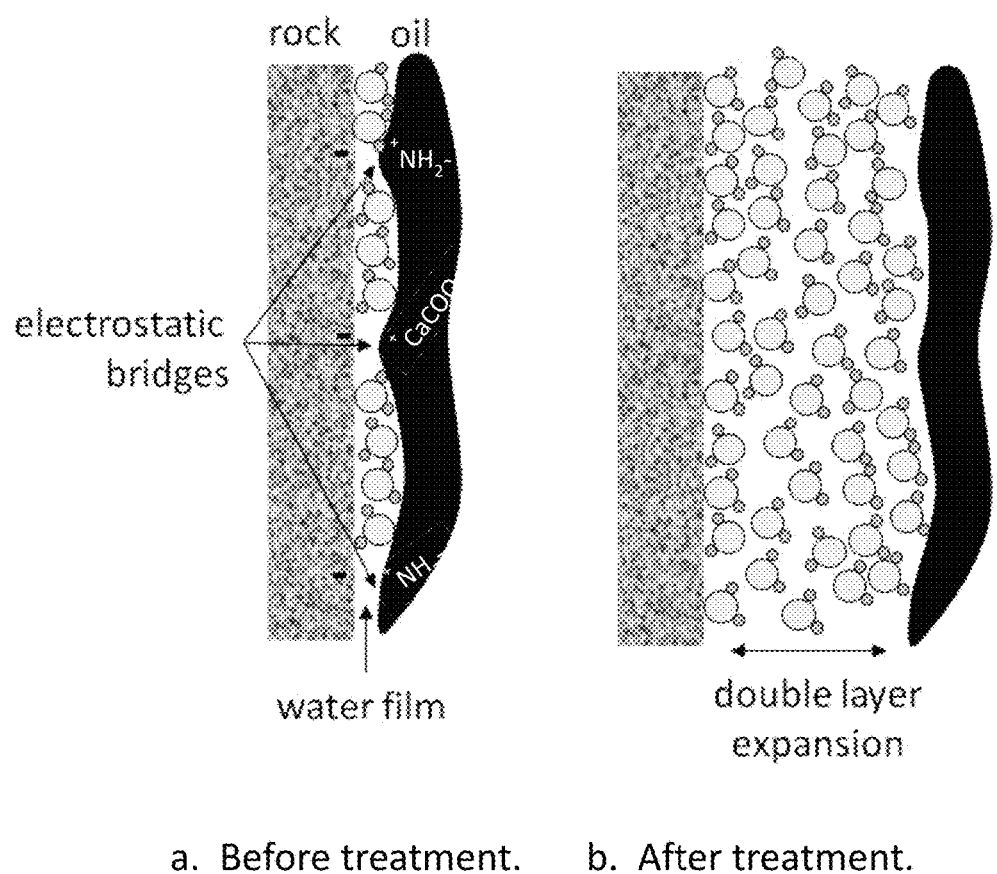
FIG. 5 shows liquid hydrocarbon desorption from a fracture wall by water addition and double layer expansion (water molecules not to scale).

FIG. 5 shows liquid hydrocarbon mobilization from a macrofractured rock surface by water layer expansion due to decreased salinity and/or a decrease in the number of oppositely charged sites on oil and rock surfaces.

Figure 6:
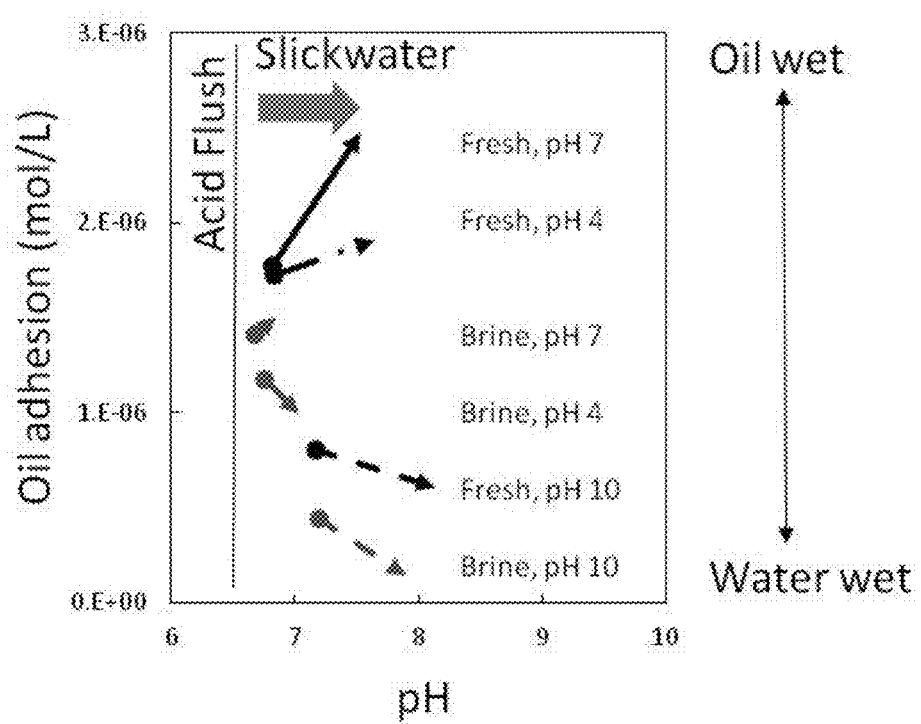
FIG. 6 shows calculated oil adhesion for illite and calcite-containing reservoir.

FIG. 6 shows the effect of fracturing fluid composition on oil adhesion and water wettability for a high base, low acid oil in a tight formation containing illite and calcite. The brine was 0.4M NaCl+25 mmol/L $CaCl_2$+25 mmol/L $MgCl_2$. Fresh water was 20 mmol/L NaCl. Temperature was 115° C.

Figure 7:
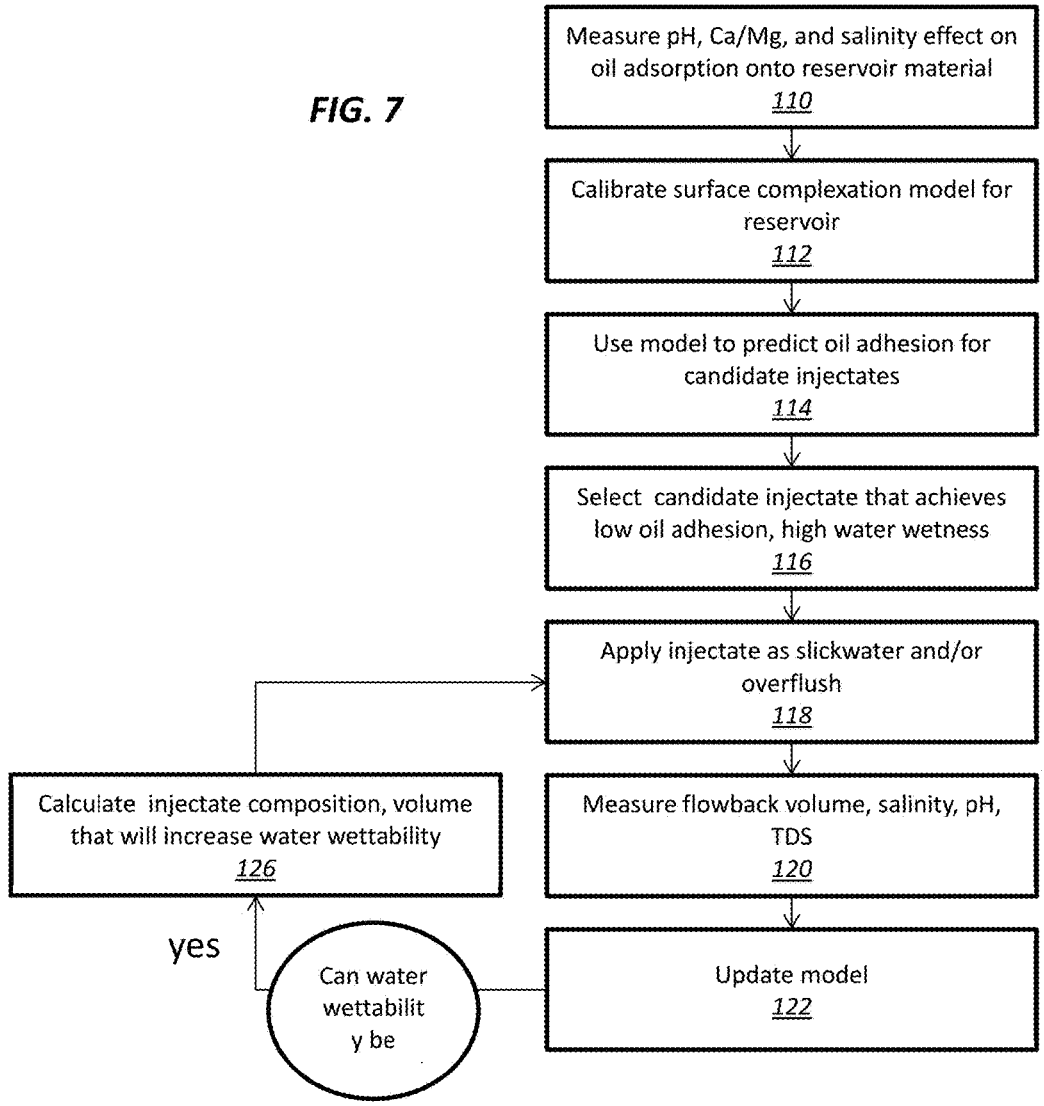
FIG. 7 is a flowchart illustrating steps of the invention.

FIG. 7 is a flowchart showing steps involved in an exemplary embodiment of the method of the invention, which is described in detail below. Box 110 shows the initial measurement of pH, Ca/Mg and salinity effect on liquid hydrocarbon adsorption onto the reservoir. Box 112 shows that a surface complexation model for the reservoir can be calibrated. Box 114 shows that a predictive model described in detail below can be used to predict oil adhesion for injectates. Box 116 shows that a candidate injectate can be selected that is designed to achieve low liquid hydrocarbon adhesion and high water wettability in the reservoir. Box 118 shows that the injectate can be applied or pumped into the reservoir as slickwater and/or overflush. After flowback volume, salinity, pH and/or total dissolved solids (TDS) are measured, shown in box 120, the predictive model can be undated, shown box 122. If a determination is made that water wettability can be increased in the reservoir, shown at 124, the injectate composition and volume that will increase water wettability can be calculated, illustrated in box 126, which is applied or pumped into the reservoir as shown in box 118.

Referring to FIG. 7, the model referred to in boxes 112, 114 and 122 can be a predictive model of the type discussed in detail in U.S. Pat. No. 8,812,271, the entirety of which is incorporated by reference herein as though it was fully set forth, which is executed by a processing system such as, for example, a control system on a platform, which can comprise conventional operating system and storage components such as a system bus connecting a central processing unit (CPU), a hard disk, a random access memory (RAM), I/O and network adaptors facilitating connection to user input/output devices and interconnection with other devices on a network. The Random Access Memory (RAM) can contain operating system software, which controls in a known manner low-level operation of the processing system. The server RAM can contain the model identified in boxes 112, 114 and 122, during execution of the steps therein. Each model is configurable with measurement and/or predetermined data stored in a database or other storage component, which is operatively coupled or connected to the processing system.

Data to be inputted can be received by a known type of receiving means for such systems are based on measured chemical characteristics of the liquid hydrocarbon, connate water, water available for injection, and/or analogous well experience underground rock. The measurement data may comprise specific measured chemical values as directly measured by suitably positioned measurement equipment, or ratios of values of chemical characteristics, or may comprise values derived from a number of separate chemical characteristic measurements, according to known techniques. Therefore, the raw measured chemical characteristics may, if necessary or preferred, be manipulated by appropriate software, executed by the CPU of the system, in order to generate data that are suitable for inputting into the predictive model. Such manipulation may simply comprise a measurement unit conversion or the creation of a required ratio of measured values.

Liquid Hydrocarbon Retention: At the microscopic level, liquid hydrocarbons are attached to reservoirs by electrostatic forces between charged hydrocarbon surfaces and charged mineral surfaces. A thin layer of water separates the two (FIG. 5). Liquid hydrocarbon-reservoir adhesion is controlled by electrostatic attraction across the water layer and by the thickness of the water layer. High electrostatic attraction and thin water layers favor adhesion. This means that water wettability depends upon two chemical mechanisms: First, electrostatic attraction between oppositely charged groups on the liquid hydrocarbon and reservoir surfaces, and; second, water layer thickness controlled by changes in salinity.

Using the methods described herein the recovery of liquid hydrocarbons and the economic consequences thereof can be calculated. For example, when water wettability in the formation is increased, liquid hydrocarbon recovery is enhanced. Additionally, when it is determined that the effect of the first mechanism causes a reduction in adhesion that is greater than increase of adhesion caused by the use of water with a relatively high salinity that decreases water film thickness, fresh water with a low salinity does not have to be used thereby reducing liquid hydrocarbon recovery costs.

Liquid Hydrocarbon Release: Fracturing fluids chemically aid liquid hydrocarbon recovery by imbibing into, and expanding, the thin layers of water separating oil from the rock (FIG. 5). Water imbibing into small fractures and connected pores via chemical reactions, through osmosis (the diffusion of water from the dilute water flood into the more saline connate water in the pores or fractures), and by adsorptive forces can prompt "countercurrent imbibition"—a roughly 1:1 volumetric replacement of liquid hydrocarbon in the microfracture by injectate. Because produced liquid hydrocarbon volumes are roughly 10-20 times greater than retained water volumes (depending on the molecular weight of the liquid hydrocarbon which typically range from 200 to 300 g/mol), countercurrent imbibition-produced liquid hydrocarbon is a relatively small fraction of the total liquid hydrocarbon recovered. On a molar basis the amount of retained water is roughly equivalent to the total amount of liquid hydrocarbon produced. This means that one liter of retained water produces ~10-20 liters of liquid hydrocarbon from a frac job. This is probably because, unlike in rock-dominated microfractures, fresh macrofractures are water-dominated posing less physical hindrance of water movement to contact the rock surfaces and free the liquid hydrocarbon. Double layer expansion occurs rapidly in the macrofractures during the fracking process. Countercurrent imbibition that releases liquid hydrocarbon from the microfractures occurs more slowly.

Modifying Retained Water Chemistry to Increase Liquid Hydrocarbon Recovery: Liquid hydrocarbon release from both macrofractures and microfractures can be increased by altering the injectate composition to increase water wettability in the retained water zone. The method by which this is done is shown schematically in FIG. 7. Increased water wettability is linked with liquid hydrocarbon release from fracture surfaces, and from increased countercurrent imbibition release of liquid hydrocarbons from microfractures. Identifying the chemical conditions under which tight formations become more water wet can be done by calibrating a surface complexation calculation for the primary minerals in the formation, such as for example using the technique described in U.S. Pat. No. 8,812,271, the entirety of which is incorporated by reference herein as though it was fully set forth, to results of liquid hydrocarbon adhesion experiments such as that shown in FIG. 3, which can be used to estimate adsorption of liquid hydrocarbons to rock in the formation. Then the calibrated model can be used to predict in situ wettability alteration by candidate slickwater, or overflushes. Flowback volumes and compositions are used to refine the model and design subsequent injectate compositions that enhance oil recovery economics. Alternatively, estimated wettability for an underground reservoir can be done by using data from analogous well experience such as, for example, one or more of the following: previously measured flowback chemistries and volumes, previously measured injectate chemistries and volumes, and mineralogic data.

Using the calibrated model to consider injectate chemistries that increases liquid hydrocarbon recovery requires accounting for reservoir fluid-rock reactions that change the composition of the injectate. The most important reactions are: mixing of the injectate with the connate brine, ion exchange with reservoir clays, and dissolution of calcite (or dolomite or gypsum or anhydrite). The calculation is done with a geochemical reaction path transport code using, for example, EQ6, GWB, PHREEQC programs, which are known geochemical modeling programs.

Monitoring Flowback to Estimate In Situ Water Wettability and Modify Injectate Chemistry: The method described herein involves updating the injectate composition from time-to-time to reformulate the injectate to maximize oil recovery. This can be done by calculating in situ oil adhesion, which is a determinant of water wettability, from the composition of the flowback, and then modifying the injectate composition, if necessary, to more closely approach higher water wettability conditions in situ. For example, measured chloride levels (or bromide tracer levels if chloride is in the injectate) in the flowback quantifies the time-dependent mixing of injectate with connate brine. The Ca/Na ratio of the flowback measures the extent of the calcite dissolution and ion exchange reactions with the matrix clays:

$$CaCO_3 + H^+ \leftrightarrow Ca^{+2} + HCO_3^-$$

$$2{>}Na + Ca^{+2} \leftrightarrow {>}Ca + 2Na^+$$

where ">" denotes an ion exchange site on a clay. Measuring Ca, Na, Cl, pH, and $HCO_3^-$ levels in the flowback allows the extent of dilution and chemical reaction to be quantified at each point in time.

In order to estimate the in situ fluid composition, a geochemical reaction path transport code is calibrated using the flowback composition and volumes. The cation exchange capacity and exposed mineral fractions, two key uncertainties in the geochemical model, will be refined in the calibration step. Other geochemical uncertainties, such as mineral dissolution/growth rates and retained water $CO_2$ partial pressure, will likewise be more tightly constrained in the model calibration step. The primary output of the calculation is an estimate of the in situ fluid composition early in the slickwater and overflush periods when water is retained, before appreciable connate water backflow has occurred.

In another embodiment, reservoir core material is reacted with connate fluid and a series of candidate injectates and the resulting fluid chemical changes used to quantify mineral dissolution and ion exchange. Reservoir core material is reacted with connate fluid and a series of injectates under reservoir conditions to build an empirical correlation between input fluid chemistry and post-reaction fluid chemistry. In another embodiment geochemical reaction path code is used to correlate observed changes in fluid chemistry in order to estimate the magnitude and extent of reservoir reactions.

The calculated in situ fluid composition in the retained water zone is then analyzed to determine whether the injectate composition, and volume should be modified, so that the in situ fluid composition needs to be shifted to lower oil adhesion (increase water wettability) in the zone where water is retained. Specifically, a determination can be made as to the amount of acid, base, hardness, and/or salinity that should be added to the injectate to move the in situ fluid composition to lower adhesion. The iterative process of flowback analysis, model (re)calibration, and injectate modification is repeated until it is not economically advantageous for the calculated fluid composition in the retained water zone to be changed to further lower adhesion (FIG. 7).

The following embodiments below illustrate injectate design, flowback monitoring, and estimation of achievable liquid hydrocarbon recovery, which can be used to enhance liquid hydrocarbon recovery in previously produced wells in tight formations that have been hydro-fractured, horizontal wells undergoing slickwater fracturing, horizontal wells after they have been hydro-fractured, and as an overflush between adjacent fracture zones in a single or adjacent wells.

Example Embodiments

The following example describes how the invention can be used to increase liquid hydrocarbon recovery from a tight formation containing illite and calcite. FIG. 3 is a compilation of experimentally observed trends that shows that increasing pH causes high base, low acid (AN/BN≤0.33) liquid hydrocarbon to be released from illite. Increased salinity, and higher Ca and Mg levels also increase liquid hydrocarbon release from illite. Clay minerals, when present, are typically the reservoir mineral that liquid hydrocarbons adhere to.

A surface complexation model, such as that described in U.S. Pat. No. 8,812,271, was calibrated to reproduce the experimentally observed trends in FIG. 3. The surface complexation model was then used as input in a geochemical reaction path model describing all of the reactions in the larger reservoir including mineral dissolution, ion exchange, adsorption, and aqueous speciation. The geochemical model was used to predict oil adsorption in the reservoir material after an acid wash, followed by different injectates of different composition. In practice, candidate waters will be determined by local availability, cost, and regulations. The method described herein identifies candidate waters that alone, or with chemical modification, will achieve highest recovery of liquid hydrocarbons.

FIG. 6 shows calculated high base, low acid oil adhesion for pH-modified brine and freshwaters. Adhesion is calculated in moles/L of oppositely charged oil-reservoir surface pairs. In the calculation, connate brine was first theoretically equilibrated with an oil-bearing reservoir material containing illite and calcite. The consequences of an acid flush were then calculated. The pH after reaction of the acid with the reservoir was 6.25 (dissolution of calcite raised the pH). Then injectate was theoretically added to the reservoir material and oil adhesion calculated. The circles are the conditions after one pore volume of injectate had been injected. The arrows mark the conditions after a second pore volume of slickwater had been injected. The calculation in FIG. 6 was done using PHREEQC. Anti-scalant addition was assumed to prevent calcite growth at high pH. FIG. 6 shows that, in this embodiment, injectate brines increase water wettability more than low salinity injectate for a given pH. This will be advantageous in some locations where fresh water is limited or costly. Water wettability of brine, and fresh water, is lowest (adhesion is highest) at pH 7. Brine at pH 4, or pH 10, has higher water wettability (lower adhesion), higher than brine at pH 7. Fresh water at pH 4, or pH 10, has higher water wettability (lower adhesion), higher than fresh water at pH 7. In other embodiments, that consider different oil chemistries and reservoir mineralogies, the injectate-wettability trends will be different. For the embodiment shown in FIG. 6, subsequent connate mixing decreases oil adhesion further; the connate adhesion endpoint depends upon the composition of the injectate flush that preceded it. The pre-fracking calculated connate adhesion is 6-7 mol/L; the post acid flush calculated adhesion is much higher because of the lower pH (not shown on graph).

pH 10 brine causes the greatest drop in liquid hydrocarbon adhesion. pH 10 fresh water is less effective than pH 10 brine. pH 4 brine is also less effective, yet still decreases liquid hydrocarbon adhesion by roughly half compared to the base case pH 7 fresh water injectate. The choice of injectate will be made based on the tradeoff between high recovery for pH 10 injectates vs. a higher potential of calcite scale formation and the cost of anti-scalant. The pH 4 brine injectate would likely not require anti-scalant because of the lower final pH. A separate calculation is done to establish the potential for scale formation. pH 4 injectate has the additional advantage that it dissolves calcite, thereby releasing any liquid hydrocarbons adsorbed to calcite, while also increasing formation permeability. For the sake of illustration, the pH 4 brine is used below to show how the amount of extra oil that will be recovered by modifying the injectate from the base case is estimated.

Here we assume that the amount of liquid hydrocarbon recovered by unaltered slickwater injectate is 30% of the accessible Original Oil In Place (OOIP) because that percentage is roughly the amount of oil that is accessible for production during primary recovery of un-fracked conventional reservoirs. But because unaltered slickwater injectate recovers only ~6% of the OOIP in tight formations, the total accessible oil may be inferred to be only ~20% (6% divided by 30%) of the total. The remaining 80% of the tight formation liquid hydrocarbon is unaccessible and unreachable by fracturing fluids.

Changing the salinity and hardness of low salinity waterfloods prompts the additional production of 10-30% OOIP from conventional unfracked reservoirs. Because these waterfloods have not been optimized, for example by modifying the pH, to achieve maximum recovery, we set the maximum additional production achievable by slickwater (and/or designed overflushing) at 40% OOIP in the accessible (20%) portions of the tight formation. This is equivalent to 8% additional liquid hydrocarbon recovery from the bulk rock. In other words, the ceiling for recoverable liquid hydrocarbons in tight formations is set to 14% OOIP.

Future improvements in fracturing effectiveness will likely increase the fraction of oil that is reachable by fracturing fluids, with concomitant recovery improvement. Moreover, experience in individual reservoirs will make site-specific value estimation more precise.

If an oil adhesion measure of 2.5e-6 mol/L for unaltered injectate ("Fresh, pH 7" in FIG. 6) results in 6% recovery (a rough industry average), and an adhesion measure of 0 mol/L for an altered slickwater results in 14% recovery, overall recovery for a particular injectate (or overflush) can be estimated using the calculated oil adhesion and a linear interpolation between the two end members. pH 4 brine injectate results in an oil adhesion measure of 1e-6 mol/L. Doing the interpolation above points to an additional 3.2% of liquid hydrocarbons OOIP, i.e. 9.2% total OOIP, or a 53% increase in liquid hydrocarbon recovery. pH 10 brine injectate, with an oil adhesion measure of 1.4-7 mol/L is projected to produce a total of 13.5% OOIP.

In another embodiment, the amount of acid needed to achieve low pHs and high Ca (and Mg) in injectates is initially calculated from laboratory tests with core. In another embodiment, the amount of base needed to achieve high pHs in injectates is initially calculated from laboratory tests with core.

Timing

The method described herein may require a period of shut-in of the well after injection to allow greater reaction of the injectate with the rock and oil. The largest benefits will arise if the method is applied during the fracturing of a horizontal or vertical well. Specifically, the first slickwater going into the formation should be optimized for recovery. Less additional oil is likely to be recovered in secondary mode, i.e. in the footsteps of a previous slickwater or overflush. By the same token, a modified overflush will recover less additional oil than a modified slickwater.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method for designing an injectate to enhance liquid hydrocarbon production from an underground rock formation comprising the steps of:
   (a) designing an initial injectate to achieve a desired wettability based on at least one of the following selected from a group consisting of: (1) chemical characteristics of two or more of the rock formation, the liquid hydrocarbon, connate water, and water available for injection; (2) analogous well experience; and (3) oil-water-rock adhesion data;
   (b) pumping the initial injectate into a well in the underground rock formation;
   (c) analyzing injectate flowback resulting from pumping the initial injectate into the well for an estimated achieved wettability based on at least one or more of the following: pH, hardness, volume, salinity and temperature determined from the flowback; and
   (d) modifying the initial injectate to form a modified injectate based on the estimated achieved wettability if the estimated achieved wettability of step (c) is substantially different from the desired wettability.

2. The method of claim 1, and wherein the step of designing an initial injectate further comprises calculating an estimated wettability comprising calibrating a surface complexation calculation to estimated adsorption of liquid hydrocarbon to rock in the formation.

3. The method of claim 2, wherein the step of calculating estimated wettability comprises estimating reservoir fluid-rock reaction using a geochemical reaction path transport code.

4. The method of claim 2, further including the step of estimating in situ fluid composition by calibrating a geochemical reaction path transport code using flowback composition and volumes.

5. The method of claim 4, wherein step of calculating estimated wettability comprises estimating in situ fluid composition early in a slickwater or period in which water is being retained before appreciable connate water backflow has occurred.

6. The method of claim 4, wherein the step of calculating estimating wettability comprises estimating mineral dissolution and ion exchange from backflow of connate water treated with a candidate injectate.

7. The method of claim 4, wherein the step of calculating estimated wettability comprises at least one step selected from a group consisting of estimating in situ fluid composition by empirical observations of laboratory-measured fluid-rock equilibration experiments and reaction path modeling of experimental reaction of core material with candidate fluids.

8. The method of claim 4, wherein the step of analyzing injectate flowback comprises at least one step selected from a group consisting of calculating an estimate of the amount of acid, base, hardness, and salinity that should be added to the injectate to move the in situ fluid composition to lower liquid hydrocarbon adhesion in the underground rock formation.

9. The method of enhancing liquid hydrocarbon production from the underground rock formation using the steps of claim 2, and further comprising of the steps of:
   (f) pumping the modified injectate into the well in the underground rock formation;
   (g) analyzing injectate flowback resulting from pumping the modified injectate into the well for an estimated achieved wettability based on at least one or more of the following parameters selected from a group consisting of: pH, hardness, volume, salinity and temperature determined from the flowback; and
(h) modifying the modified injectate to form a further modified injectate based on the estimated achieved wettability of step (g) if the estimated achieved wettability is substantially different from the desired wettability.

10. The method of claim 1, wherein the step of analyzing injectate flowback comprises calculating in situ oil adhesion.

11. The method of claim 1, wherein the step of modifying the initial injectate comprises altering the pH, the salinity, and hardness of the initial injectate to decrease oil wettabillity.

12. The method of claim 11, comprising repeating steps (f)-(h) until the estimated achieved wettability is substantially the same as the desired wettability.

13. The method of claim 11, comprising repeating steps (t)-(h) until it is no further economically advantageous for the calculated fluid composition in the retained water zone to be changed to substantially further lower adhesion between liquid hydrocarbons and rock in the underground rock formation.

14. The method of claim 11, further comprising the step of pumping the modified injectate into a previously produced well that has been hydro-fractured.

15. The method of claim 11, further comprising the step of pumping the modified injectate into a horizontal well undergoing slickwater fracturing.

16. The method of claim 11, further comprising the step of pumping the modified injectate into a horizontal well after it has been hydro-fractured.

17. The method of claim 11, further comprising the step of pumping the modified injectate as part of an overflush between adjacent fracture zones or one or more wells.

18. The method according to claim 11, wherein the step of modifying the modified injectate comprises adjusting the chemistry of the modified injectate to raise the pH of injectate flowback resulting from pumping the modified injectate fluid in the underground.

19. The method according to claim 11, wherein the step of modifying the modified injectate comprises adjusting the chemistry of the modified injectate to lower the pH of injectate flowback resulting from pumping the modified injectate fluid in the underground reservoir.

20. The method according to claim 11, wherein the step of modifying the modified injectate comprises adjusting the chemistry of the modified injectate to raise the salinity of injectate flowback resulting from pumping the modified injectate fluid in the underground.

21. The method according to claim 11, wherein the step of modifying the modified injectate comprises adjusting the chemistry of the modified injectate to lower the salinity of injectate flowback resulting from pumping the modified injectate fluid in the underground reservoir.

22. The method according to claim 11, wherein the step of modifying the modified injectate comprises adjusting the chemistry of the modified injectate to raise the hardness of injectate flowback resulting from pumping the modified injectate fluid in the underground.

23. The method according to claim 11, wherein the step of modifying the modified injectate comprises adjusting the chemistry of the modified injectate to lower the hardness of injectate flowback resulting from pumping the modified injectate fluid in the underground reservoir.

24. The method of claim 1, wherein the steps of pumping the initial injectate into a well in the underground rock formation and analyzing injectate flowback resulting from pumping the initial injectate into the well comprises pumping the initial injectate into and analyzing injectate flowback from a single well.

25. The method of claim 1, wherein the steps of pumping the initial injectate into a well in the underground rock formation and analyzing injectate flowback resulting from pumping the initial injectate into the well comprises pumping the initial injectate into and analyzing injectate flowback from more than one well resulting from cross-well waterflooding.

26. The method of claim 1, wherein the step of modifying the initial injectate comprises adding a pH buffering agent to the initial injectate.

27. The method according to claim 1, wherein the step of modifying the initial injectate comprises adjusting the chemistry of the initial injectate to raise the pH of injectate flowback resulting from pumping the initial injectate fluid in the underground reservoir.

28. The method according to claim 1, wherein the step of modifying the initial injectate comprises adjusting the chemistry of the initial injectate to lower the pH of injectate flowback resulting from pumping the initial injectate fluid in the underground reservoir.

29. The method according to claim 1, wherein the step of modifying the initial injectate comprises adjusting the chemistry of the initial injectate to raise the salinity of injectate flowback resulting from pumping the initial injectate fluid in the underground reservoir.

30. The method according to claim 1, wherein the step of modifying the initial injectate comprises adjusting the chemistry of the initial injectate to lower the salinity of injectate flowback resulting from pumping the initial injectate fluid in the underground reservoir.

31. The method according to claim 1, wherein the step of modifying the initial injectate comprises adjusting the chemistry of the initial injectate to raise the hardness of injectate flowback resulting from pumping the initial injectate fluid in the underground reservoir.

32. The method according to claim 1, wherein the step of modifying the initial injectate comprises adjusting the chemistry of the initial injectate to lower the hardness of injectate flowback resulting from pumping the initial injectate fluid in the underground reservoir.

33. The method according to claim 1, wherein the step of calculating estimated wettability for an underground reservoir comprises using data from analogous well experience comprising one or more of the following: previously measured flowback chemistries and volumes, previously measured injectate chemistries and volumes, and mineralogic data.

34. A computer-implemented method for enhancing liquid hydrocarbon production from an underground rock formation after an initial injectate is designed by designing an initial injectate to achieve a desired wettability based on at least one of the following selected from a group consisting of: (1) chemical characteristics of two or more of the rock formation, the liquid hydrocarbon, connate water, and water available for injection; (2) analogous well experience; and (3) oil-water-rock adhesion data; and the initial injectate is pumped into a well in the underground rock formation, the method comprising the steps of:
(a) inputting data into a computer-implemented predictive model indicative of in situ wettability from flowback of the initial injectate resulting from pumping the initial injectate into the well, for calculating an estimated achieved wettability based on one or more of the following: observed pH, hardness, volume, salinity and temperature determined from the flowback; and (b) operating the predictive model to calculate a modified injectate based on the estimated achieved wettability if the estimated achieved wettability is substantially different from the desired wettability.

35. The computer-implemented method of claim 34, further comprising performing the following steps before performing steps (a) and (b):

(c) inputting data into the computer-implemented predictive model for calculating the estimated wettability for the underground reservoir based on at least one parameter selected from a group consisting of (1) chemical characteristics of two or more of the rock formation, the liquid hydrocarbon, connate water, and water available for injection; (2) analogous well experience: and (3) oil-water-rock adhesion data; and (d) operating the computer-implemented model to design the initial injectate using said wettability data to calculate a desired wettability.

36. The computer-implemented method of claim 34, further comprising the steps of operating the predictive model to (1) analyze injectate flowback resulting from pumping the modified injectate into the well for an estimated achieved wettability based on at least one or more of the following: pH, hardness, volume, salinity and temperature determined from the flowback; and (2) modify the modified injectate to form a further modified injectate based on the estimated achieved wettability of step (a) if the estimated achieved wettability is substantially different from the desired wettability.

37. The computer-implemented method of claim 36, further comprising repeating steps (1)-(2) until the estimated achieved wettability is substantially the same as the desired wettability.

38. The computer-implemented method of claim 36, further comprising repeating steps (1)-(2) until no further economic advantage is gained for the calculated fluid composition in the retained water zone to be changed to substantially further lower adhesion between liquid hydrocarbons and rock in the underground rock formation.

* * * * *